United States Patent
Wijbrans

(10) Patent No.: US 10,036,806 B2
(45) Date of Patent: Jul. 31, 2018

(54) DISTANCE MEASUREMENT USING THE TIME-OF-FLIGHT OF SIGNALS

(71) Applicant: KONINKLIJKE PHILIPS N.V., Eindhoven (NL)

(72) Inventor: Klaas Cornelis Jan Wijbrans, Rijen (NL)

(73) Assignee: Koninklijke Philips N.V., Eindhoven (NL)

(*) Notice: Subject to any disclaimer, the term of this patent is extended or adjusted under 35 U.S.C. 154(b) by 264 days.

(21) Appl. No.: 14/895,094

(22) PCT Filed: May 26, 2014

(86) PCT No.: PCT/EP2014/060757
§ 371 (c)(1),
(2) Date: Dec. 1, 2015

(87) PCT Pub. No.: WO2014/195161
PCT Pub. Date: Dec. 11, 2014

(65) Prior Publication Data
US 2016/0131755 A1 May 12, 2016

(30) Foreign Application Priority Data
Jun. 4, 2013 (EP) .................................... 13170342

(51) Int. Cl.
*G01S 3/02* (2006.01)
*G01S 13/74* (2006.01)
(Continued)

(52) U.S. Cl.
CPC ............... *G01S 13/74* (2013.01); *G01S 7/40* (2013.01); *G01S 11/06* (2013.01); *G01S 13/82* (2013.01)

(58) Field of Classification Search
CPC ... G01S 3/02; G01S 7/40; G01S 11/06; G01S 13/74; G01S 13/82
(Continued)

(56) References Cited

U.S. PATENT DOCUMENTS 5,499,199 A 3/1996 Demas et al.
6,127,931 A 10/2000 Mohr
(Continued)

FOREIGN PATENT DOCUMENTS

JP 2001051058 A 2/2001
JP 2007327956 A 12/2007
(Continued)

OTHER PUBLICATIONS

Lanzisera et al: Technical Report No. UCB/EECS-2009-69, University of California at Berkeley, May 1999, 103 Pages.
(Continued)

*Primary Examiner* — Harry K Liu

(57) ABSTRACT

There is provided a method of measuring the distance between a first device and a second device, the method comprising performing a time-of-flight-based distance measurement to measure the distance between the first device and the second device, wherein the length of the signals transmitted and/or the number of time-of-flight measurements obtained during the time-of-flight-based distance measurement is determined according to an accuracy level required for the distance measurement.

3 Claims, 9 Drawing Sheets

(51) Int. Cl.
*G01S 7/40* (2006.01)
*G01S 11/06* (2006.01)
*G01S 13/82* (2006.01)

(58) Field of Classification Search
USPC .......................................................... 342/458
See application file for complete search history.

(56) References Cited

U.S. PATENT DOCUMENTS

| | | | | |
|---|---|---|---|---|
| 7,479,889 | B2* | 1/2009 | Kazdin | G08B 21/0261 340/539.1 |
| 7,683,825 | B2 | 3/2010 | Sun et al. | |
| 8,036,679 | B1* | 10/2011 | Barbeau | H04W 4/02 340/539.13 |
| 2003/0179778 | A1 | 9/2003 | Guanter et al. | |
| 2006/0217132 | A1 | 9/2006 | Drummond-Murray et al. | |
| 2007/0052534 | A1 | 3/2007 | Bird et al. | |
| 2007/0200759 | A1 | 8/2007 | Heidari-Bateni et al. | |
| 2008/0284564 | A1 | 11/2008 | Leitch | |
| 2011/0187537 | A1 | 8/2011 | Touchton et al. | |
| 2014/0114564 | A1* | 4/2014 | Callaghan | G01C 21/20 701/416 |

FOREIGN PATENT DOCUMENTS

| | | |
|---|---|---|
| JP | 2008533436 A | 8/2008 |
| JP | 2009085780 A | 4/2009 |
| WO | 02084621 A2 | 10/2002 |
| WO | 2006075280 A2 | 7/2006 |

OTHER PUBLICATIONS

Paul et al: "Wi-Fi Based Indoor Localization and Tracking Using Sigma-Point Kalman Filtering Methods"; IEEE, 2008, pp. 646-659.
Wittwer et al: "A Distance-Bounding Concept Concept for Bilateral IEEE 802.15.4 Communication"; IEEE International Conference on Microwaves, Communications, Antennas and Electric Systems, 2009. COMCAS 2009, 4 Page Document.
Zanca et al: "Experimental Comparison of RSSI-Based Localization Algorithms for Indoor Wireless Sensor Networks"; RealWSN'08, Apr. 2008, ACM 5 Page Document.

* cited by examiner

DISTANCE MEASUREMENT USING THE TIME-OF-FLIGHT OF SIGNALS

CROSS-REFERENCE TO PRIOR APPLICATIONS

This application is the U.S. National Phase application under 35 U.S.C. § 371 of International Application No. PCT/EP2014/060757, filed on May 26, 2014, which claims the benefit of European Patent Application No. EP13170342.3, filed on Jun. 4, 2013. These applications are hereby incorporated by reference in their entirety herein.

TECHNICAL FIELD OF THE INVENTION

The invention relates to techniques for determining the distance between a first device and a second device, such as a user device and a base unit, and in particular to an improved time-of-flight based distance measurement. The invention also relates to a personal tracking system that uses the improved time-of-flight based distance measurement to determine whether a user is within a predetermined safe zone.

BACKGROUND TO THE INVENTION

A number of personal tracking systems are available that can be used to track or monitor the position of a person. Users of such systems can include elderly people, children, people with Alzheimer's disease, dementia or autism (who are prone to wandering) or patients in a care home or hospital. A 'geofence' may be established that bounds safe or acceptable areas in which the user is allowed to move freely, such as in their home, or conversely areas that the user should not enter, and the tracking system can be used to verify whether the user is within their safe zone or geographical fence, and if not, trigger an alarm and determine the position of the user.

These systems typically comprise a user-worn or user-carried device and a base unit that is placed in (and helps to define) the safe zone. The user device can include a GPS receiver in combination with another wireless communication technology, such as cellular communications or WiFi, that is used to monitor the position of the user. However, these systems are hindered by either poor performance due to low location sampling rates (to conserve power), poor battery life (if the sampling rate is set higher) or have a significant size due to inclusion of a large battery in the device.

In some cases the base unit can act as a beacon for the user device, and the user device can use signals sent from the base unit to determine whether the user device (and thus the user) is within the safe zone. Some devices use a measurement of the received signal strength (for example a measurement of the power in a received radio signal, known as a Received Signal Strength Indicator, RSSI) to estimate the distance from the base unit and thus determine whether the user device is within the safe zone. This technique can often consume less power than other location-estimating technologies such as GPS. However, distance estimation based on signal strength measurements is not very robust and either produces inconsistent or erratic distance measurements or requires assistance from another location-determining technology such as GPS or triangulation using cellular base stations.

In particular, it has been found that RSSI-based distance detection devices produce inconsistent distance results as the orientation of the user and/or user device changes with respect to the base unit. This is illustrated in FIG. 1. In this Figure, a user 2 that is carrying a user device 4 is shown at two different distances from and orientations with respect to a base unit 6. In the first distance and orientation (labelled 'A'), the user 2 and user device 4 are oriented such that there is line of sight from the user device 4 to the base unit 6 which results in the user device 4 receiving a relatively strong signal from the base unit. This orientation of the user 2 and user device 4 can provide a reasonably reliable estimate of the distance between the user device 4 and the base unit 6 using signal strength measurements. However, in the second distance and orientation (labelled 'B'), the user 2 is much closer to the base unit 6 but there is no line of sight between the user device 4 and the base unit 6 as it is blocked/shielding by the body of the user 2. This shielding of the user device 4 by the body of the user 2 attenuates the strength of the signal received from the base unit 6 by many decibels and thus leads the user device 4 to determine that the user device 4 is further from the base unit 6 than is in fact the case (and it may even be determined that the user 2 is outside the determined safe zone depending on the level of attenuation).

In addition, objects in and the materials used to construct the home or healthcare environment of the user can affect the strength of the received signals.

An alternative technique for determining the distance between a user device and a base unit is based on the time-of-flight (ToF) of signals between the user device and base unit. This technique is much more robust against signal attenuation. Generally, time of flight measurements are based on signals transmitted in the ultra wideband, UWB range (2.4-5 GHz) because the accuracy that can be achieved is dependent on the amount of bandwidth that is available and the signal to noise ratio (according to the Cramer-Rao limit). However, a disadvantage of UWB time-of-flight or time-of-flight in the GHz range is the limited range of the transmissions (when keeping power consumption down) or high energy consumption of the user device (when trying to increase the range).

Thus, it is desirable to perform time-of-flight measurements using narrowband communications (for example in the 900 MHz range) since less power is required and the range is improved over UWB, and sub-meter accuracies have been shown for such systems. However, a large number of messages need to be exchanged between the user device and base unit in order to produce an accurate result, but this results in additional power consumption and in some countries and/or specifications there are regulatory limits on the total time the transmitter is allowed to be active (e.g. at most 10% of the time).

There is therefore a need for an improved technique for performing a time-of-flight-based distance measurement that can provide a distance measurement to a desired level of accuracy while minimising power consumption and that is suitable for use in a personal tracking system to determine whether a user is within a predetermined safe zone.

SUMMARY OF THE INVENTION

According to a first aspect of the invention there is provided a method of measuring the distance between a first device and a second device, the method comprising performing a time-of-flight-based distance measurement to measure the distance between the first device and the second device, wherein the length of the signals transmitted and/or the number of time-of-flight measurements obtained during the time-of-flight-based distance measurement is determined according to an accuracy level required for the distance measurement.

Preferably the length of the signals transmitted during the time-of-flight-based distance measurement is set to a first length when a first accuracy level is required and a second length when a second accuracy level is required, wherein the first length is shorter than the second length and the first accuracy is less than the second accuracy.

Preferably the number of time-of-flight measurements obtained during the time-of-flight-based distance measurement is set to a first number when a first accuracy level is required and a second number when a second accuracy level is required, wherein the first number is less than the second number and the first accuracy is less than the second accuracy.

Preferably the method further comprises the steps of determining an initial estimate of the distance between the first device and the second device; and determining the level of accuracy required for the distance measurement from the initial estimate of the distance.

In some embodiments the initial estimate of the distance is determined from the received signal strength of a signal transmitted between the first device and the second device. In other embodiments the initial estimate of the distance is determined using one or more time-of-flight measurements obtained using signals of a first length.

Preferably performing the time-of-flight-based distance measurement comprises obtaining one or more measurements of the time-of-flight between the first device and the second device, wherein a measurement of time-of-flight is obtained by: transmitting a first signal of the determined length between the first device and the second device; transmitting a response signal between the first device and the second device; and determining the time-of-flight from the time elapsed from the transmission of the first signal to receipt of the response signal and the time between receipt of the first signal and transmission of the response signal.

In some embodiments the method further comprises the step of determining whether the response signal was transmitted in response to receiving a direct or reflected first signal.

Preferably the step of determining whether the response signal was transmitted in response to receiving a direct or reflected first signal comprises determining the transmission power of the first device and the second device; determining the strength of signals received at the first device and at the second device; determining whether the response signal was transmitted in response to receiving a direct or reflected first signal using the transmission powers and the received signal strengths.

Preferably the method further comprises the step of correcting the time-of-flight measurement obtained using the response signal by the time between receipt of a direct response signal and receipt of a reflected response signal if it is determined that the response signal was transmitted in response to receiving a reflected first signal.

In some embodiments, the method further comprises the step of reducing the transmission power used to transmit the first signal after correcting the time-of-flight measurement.

In preferred embodiments, the method is for determining whether the first device and second device are within a predetermined distance of each other.

In those embodiments, the method preferably further comprises the steps of estimating the uncertainty in the distance measurement obtained using the time-of-flight-based distance measurement; evaluating $d+u<R$, and $d-u>R$ where d is the distance measurement, u is the estimate of the uncertainty and R is the predetermined distance; and in the event that neither $d+u<R$ nor $d-u>R$ then determining that a higher level of accuracy is required and obtaining a further one or more time-of-flight measurements; otherwise using the distance measurement d to determine whether the first device and the second device are within the predetermined distance of each other.

In some embodiments, the further one or more time-of-flight measurements are obtained using signals of the first length or of a second length, the second length being longer than the first length.

In further embodiments, the method comprises, after obtaining the further one or more time-of-flight measurements, the steps of determining a distance measurement d' from the one or more time-of-flight measurements and the further one or more time-of-flight measurements; estimating the uncertainty u' in the distance measurement d'; evaluating $d'+u'<R$, and $d'-u'>R$; in the event that neither $d'+u'<R$ nor $d'-u'>R$ then determining that a higher level of accuracy is required and obtaining a further one or more time-of-flight measurements; otherwise using the distance measurement d' to determine whether the first device and second device are within the predetermined distance of each other.

In some embodiments, prior to performing the time-of-flight-based distance measurement procedure, the method comprises the steps of measuring the received signal strength of a signal transmitted between the first device and the second device; comparing the received signal strength to a threshold value; determining that the first device and the second device are within the predetermined distance of each other if the received signal strength is above the threshold value; otherwise performing the time-of-flight-based distance measurement.

In some embodiments, where it is determined using the time-of-flight-based distance measurement that the first device and the second device are within the predetermined distance of each other, the method further comprises measuring the received signal strength of another signal transmitted between the first device and the second device; comparing the received signal strength of said another signal to the received signal strength of the previous signal; if the received signal strength of said another signal is less than the received signal strength of the previous signal, performing another time-of-flight-based distance measurement; if the received signal strength of said another signal is greater than the received signal strength of the previous signal, comparing the received signal strength of said another signal to the threshold value and if the received signal strength of said another signal is greater than the threshold value determining that the first device and second device are within the predetermined distance of each other, otherwise performing a further time-of-flight-based distance measurement.

A second aspect of the invention provides a method of operating a device to measure the distance between the device and another device, the method comprising performing a time-of-flight-based distance measurement to measure the distance between the device and said another device, wherein the length of the signals transmitted and/or the number of time-of-flight measurements obtained during the time-of-flight-based distance measurement is determined according to an accuracy level required for the distance measurement.

Further embodiments of the method of operating the device are contemplated in which the device operates according to either of the first and second devices defined in the above methods and/or as described in the following detailed description.

A third aspect of the invention provides a method of operating the 'another device' as defined in any of the embodiments of the above second aspect of the invention.

According to a fourth aspect of the invention, there is provided a system comprising a first device and a second device, the first device and the second device being configured to perform a time-of-flight-based distance measurement to measure the distance between the first device and the second device, wherein the length of the signals transmitted and/or the number of time-of-flight measurements obtained during the time-of-flight-based distance measurement is determined according to an accuracy level required for the distance measurement.

Preferably the length of the signals transmitted by the first device and/or the second device during the time-of-flight-based distance measurement is set to a first length when a first accuracy level is required and a second length when a second accuracy level is required, wherein the first length is shorter than the second length and the first accuracy is less than the second accuracy.

Preferably the number of time-of-flight measurements obtained during the time-of-flight-based distance measurement by the first device and the second device is set to a first number when a first accuracy level is required and a second number when a second accuracy level is required, wherein the first number is less than the second number and the first accuracy is less than the second accuracy.

Preferably, the first device and/or the second device are further configured to determine an initial estimate of the distance between the first device and the second device; and determine the level of accuracy required for the distance measurement from the initial estimate of the distance.

In some embodiments the first device and/or the second device are configured to determine the initial estimate of the distance from the received signal strength of a signal transmitted between the first device and the second device. In other embodiments the first device and/or the second device are configured to determine the initial estimate of the distance using one or more time-of-flight measurements obtained using signals of a first length.

Preferably the first device and the second device are configured to perform the time-of-flight-based distance measurement by obtaining one or more measurements of the time-of-flight between the first device and the second device by: transmitting a first signal of the determined length between the first device and the second device; transmitting a response signal between the first device and the second device; and determining the time-of-flight from the time elapsed from the transmission of the first signal to receipt of the response signal and the time between receipt of the first signal and transmission of the response signal.

In some embodiments, the first device and/or the second device are further configured to determine whether the response signal was transmitted in response to receiving a direct or reflected first signal.

In those embodiments, the first device and/or the second device are preferably configured to determine whether the response signal was transmitted in response to receiving a direct or reflected first signal by determining the transmission power of the first device and the second device; determining the strength of signals received at the first device and at the second device; determining whether the response signal was transmitted in response to receiving a direct or reflected first signal using the transmission powers and the received signal strengths.

In those embodiments the first device and/or the second device are preferably further configured to correct the time-of-flight measurement obtained using the response signal by the time between receipt of a direct response signal and receipt of a reflected response signal if it is determined that the response signal was transmitted in response to receiving a reflected first signal.

In some embodiments the first device and the second device are configured to reduce the transmission power used to transmit the first signal after correcting the time-of-flight measurement.

Preferably, the first device and/or the second device are configured to determine whether the first device and second device are within a predetermined distance of each other.

In some embodiments, the first device and/or the second device are further configured to estimate the uncertainty in the distance measurement obtained using the time-of-flight-based distance measurement; evaluate $d+u<R$, and $d-u>R$ where d is the distance measurement, u is the estimate of the uncertainty and R is the predetermined distance; and determine that a higher level of accuracy is required in the event that neither $d+u<R$ nor $d-u>R$ and obtain a further one or more time-of-flight measurements; determine whether the first device and the second device are within the predetermined distance of each other using the distance measurement d in the event that one or both of $d+u<R$ and $d-u>R$.

In some embodiments the first device and/or the second device are configured to obtain the further one or more time-of-flight measurements using signals of the first length or of a second length, the second length being longer than the first length.

In some embodiments, the first device and/or the second device are further configured such that, after obtaining the further one or more time-of-flight measurements, the first device and the second device determine a distance measurement d' from the one or more time-of-flight measurements and the further one or more time-of-flight measurements; estimate the uncertainty u' in the distance measurement d'; evaluate $d'+u'<R$, and $d'-u'>R$; determine that a higher level of accuracy is required in the event that neither $d'+u'<R$ nor $d'-u'>R$ and obtain a further one or more time-of-flight measurements; determine whether the first device and second device are within the predetermined distance of each other using the distance measurement d' in the event that one or both of $d+u<R$ and $d-u>R$.

Preferably, the first device and/or the second device are further configured such that, prior to performing the time-of-flight-based distance measurement procedure, the first device and the second device measure the received signal strength of a signal transmitted between the first device and the second device; compare the received signal strength to a threshold value; determine that the first device and the second device are within the predetermined distance of each other if the received signal strength is above the threshold value; perform the time-of-flight-based distance measurement if the received signal strength is less than the threshold value.

In some embodiments, the first device and/or the second device are further configured such that if it is determined using the time-of-flight-based distance measurement that the first device and the second device are within the predetermined distance of each other, the first device and/or the second device measure the received signal strength of another signal transmitted between the first device and the second device; compare the received signal strength of said another signal to the received signal strength of the previous signal; perform another time-of-flight-based distance measurement if the received signal strength of said another signal is less than the received signal strength of the previous signal; compare the received signal strength of said another signal to the threshold value if the received signal strength of said another signal is greater than the received signal strength of the previous signal; determine that the first device and second device are within the predetermined distance of each other if the received signal strength of said another signal is greater than the threshold value; and perform a further time-of-flight-based distance measurement if the received signal strength of said another signal is less than the threshold value.

In preferred implementations, one of the first device and the second device is a portable device worn or carried by a user and the other one of said first device and the second device is a base unit.

According to a fifth aspect of the invention, there is provided a device, comprising transceiver circuitry for enabling communications with another device; and a processing unit configured to perform a time-of-flight-based distance measurement to measure the distance between the device and said another device, wherein the processing unit is configured to determine the length of the signals transmitted by the transceiver circuitry and/or the number of time-of-flight measurements obtained during the time-of-flight-based distance measurement according to an accuracy level required for the distance measurement.

Further embodiments of the device are contemplated in which the device is configured to operate according to either of the first and second devices defined in the above systems and/or as described in the following detailed description.

A sixth aspect of the invention provides an 'another device' as defined in any of the embodiments of the above fifth aspect of the invention that is configured to perform the time-of-flight distance measurement with the device of the fifth aspect.

A seventh aspect of the invention provides a system comprising at least one of the device according to the fifth aspect and an 'another device' according to the sixth aspect.

BRIEF DESCRIPTION OF THE DRAWINGS

Exemplary embodiments of the invention will now be described, by way of example only, with reference to the following drawings, in which.

DETAILED DESCRIPTION OF THE PREFERRED EMBODIMENTS

Figure 1:
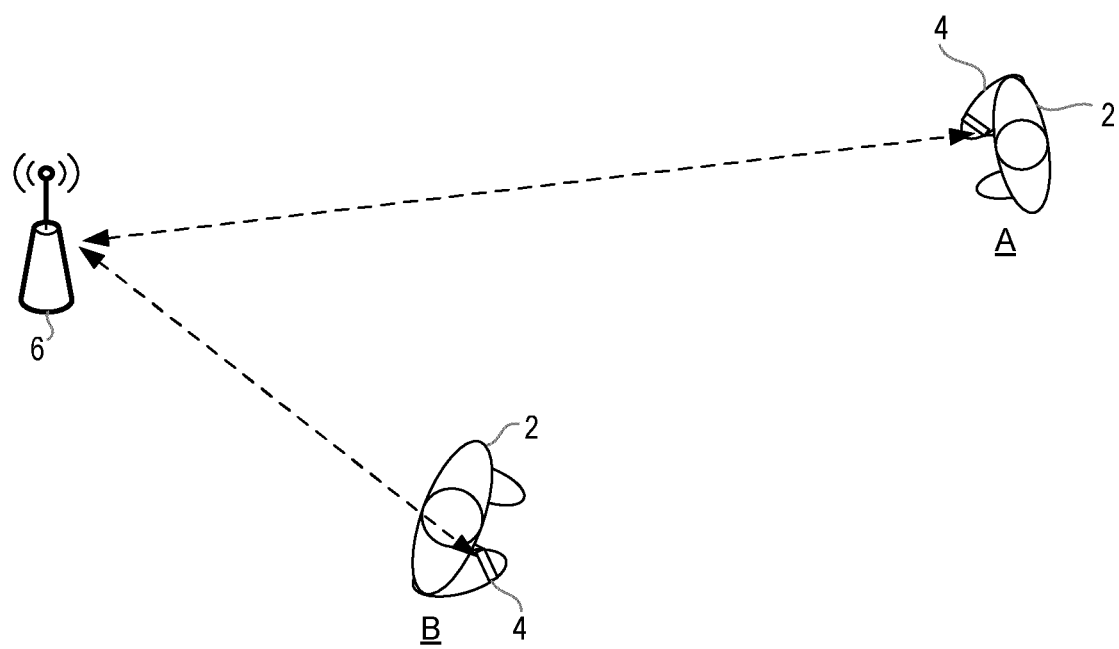
FIG. 1 is an illustration of how the orientation of a user can affect the estimation of distance using a signal strength measurement technique.
Figure 2:
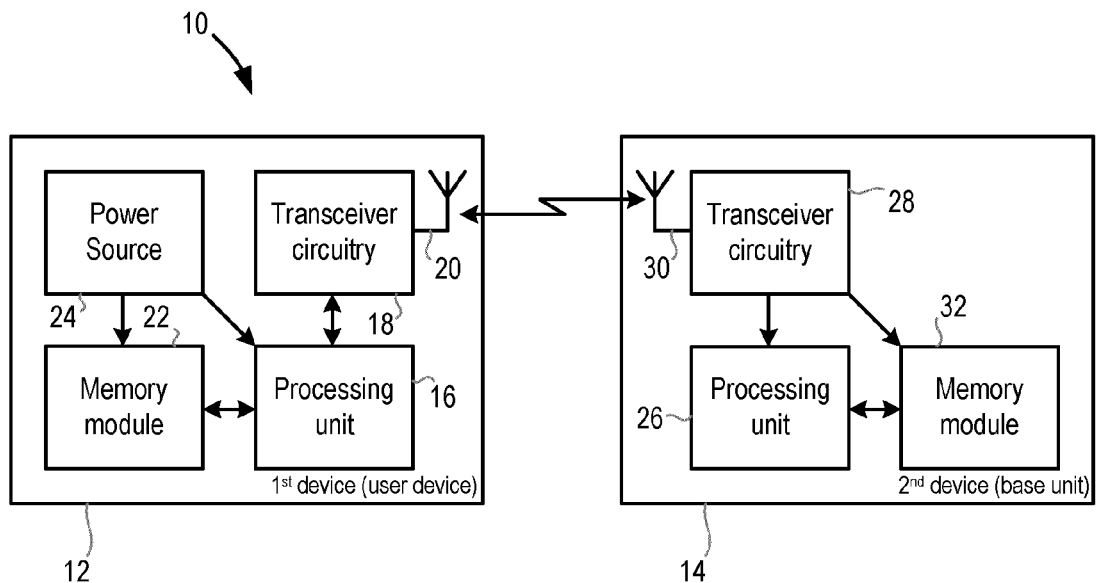
FIG. 2 is a block diagram of a first device and a second device according to an embodiment of the invention.

An exemplary system 10 according to the invention is illustrated in FIG. 2. The system 10 comprises a first device 12 and a second device 14. In this exemplary system 10 the first device 12 is a portable device that is to be carried or worn by a user and the second device 14 is a base unit that generally has a fixed location (such as in an area or environment that is deemed to be safe for the user when the system 10 is a personal tracking system), although other arrangements of the first and second devices 10, 12 are contemplated. The first device 12 may be a mobile telephone or smartphone, a personal emergency response system (PERS) device (that typically comprises a button for the user to use to request assistance or help), a mobile PERS (MPERS) device that comprises PERS device and mobile telephone functionality, a user-worn fall detector for monitoring whether a user has suffered a fall, or any other type of device for which it may be useful to determine a distance from another device or specific location.

The first device 12 comprises a processing unit 16 that controls the operation of the first device 12, transceiver circuitry 18 and an associated antenna 20 that are used to receive signals from and transmit signals to the second device 14, a memory module 22 for storing program code for execution by the processing unit 16 to perform the processing required to control the first device 12 according to the invention and a power source 24, such as a battery or battery pack.

The second device 14 comprises a processing unit 26 that controls the operation of the second device 14, transceiver circuitry 28 and an associated antenna 30 that are used to receive signals from and transmit signals to the first device 12, and a memory module 32 for storing program code for execution by the processing unit 26 to perform the processing required to control the second device 14 according to the invention.

It will be appreciated that the second device 14 will also comprise a power source (not shown), which may be a battery or battery pack, or the second device 14 may be configured to use a mains power supply.

It will also be appreciated that only the components of the first and second devices 12, 14 necessary for illustrating the invention are shown in FIG. 2 and that in practice the first and/or second devices 12, 14 may comprise additional components.

In preferred embodiments, the transceiver circuitry 18 in the first device 12 and the transceiver circuitry 28 in the second device 14 are configured to operate in a narrow bandwidth in the sub-GHz radio range, such as in the 868 MHz/915 MHz ISM band, the 430 MHz band or the 212 MHz band. In some embodiments, where multipathing corrections are required or desired for the distance measurements, the transceiver circuitry 28 and/or processing unit 26 implement a software-defined rake receiver.

In accordance with the invention, the first device 12 and second device 14 use time-of-flight (ToF) measurements to determine the distance between the devices 12, 14. An exemplary ToF measurement can be performed by the second device 14 transmitting a predefined signal to the first device 12, with the first device 12 responding with a corresponding response signal a predefined time interval after receipt of the predefined signal. The response signal transmitted by the first device 12 can be the same signal as the predefined signal transmitted by the second device 14, or it can be another predefined signal that is recognisable by the second device 14.

On receipt of the predefined response signal, the second device 14 calculates the time elapsed from the time the predefined signal was transmitted from the second device 14 to the time the predefined response signal was received from the first device 12, and determines the ToF by subtracting the predefined time interval the first device 12 waits before transmitting the predefined response signal. This ToF measurement can then be converted to a distance using distance=$c*t_{ToF}/2$, where c is the speed of light and $t_{ToF}$ is the ToF from the second device 14 to the first device 12 and back. It will be appreciated that the time-of-flight measurement could also be made by the first device 12 transmitting the initial predefined signal to the second device 14 and the second device 14 responding with the corresponding signal a predefined time interval after receipt of the initial predefined signal.

The precision of the distance measured with time-of-flight measurements depends on a number of parameters.

Firstly, the resolution of the time measurement in the software-defined radio can affect the precision. A 200 MHz sampling rate gives a 5 ns resolution, which translates to a distance accuracy of around 0.75 m. Given that the accuracy of GPS position measurements is between 3-5 meters, this accuracy for ToF is sufficient. Thus, by oversampling at a high rate (e.g. 100 MHz/200 MHz) this problem is solved.

Another parameter that can affect the accuracy of the ToF measurement is the clock phase synchronization of the clock in the first device 12. The clock in the first device 12 is running independently from the clock in the second device 14 so there can be phase difference. However, this inaccuracy is solved by averaging a number of ToF measurements. In addition, by making sure that the bit rate of the signal is a discrete multiple of the clock period in the device, it is possible to estimate the clock rate of the second device by looking at the lengths of bit periods in the signal thus increasing the accuracy even further.

As the first device 12 can be carried or worn by a user, the first device 12 may be moving towards or away from the second device 14 when the time-of-flight measurement is performed which may affect the accuracy of the ToF measurement. Assuming that the user is only walking or running (i.e. not travelling in a vehicle), the speed of movement will be relatively low, but it still places a limit on the duration of the signal exchange between the first device 12 and the second device 14. As a result, a frequent exchange of short signals is desired to mitigate measurement inaccuracies introduced by movement of the first device 12.

Another limitation on the accuracy of the ToF measurement is given by the Cramer-Rao limit which relates the accuracy of detecting the incoming message to the bandwidth of the channel and the effective signal to noise ratio (SNR).

As described in "RF Ranging for Location Awareness" by Lanzisera, S. M., Pister, K., Technical Report No. UCB/EECS-2009-69, University of California at Berkeley, May 2009, the mathematical expression that links SNR and bandwidth together to give a bound on ranging performance can be derived from the Cramer-Rao Lower Bound (CRB). The CRB can be calculated for any unbiased estimate of an unknown parameter. Ranging as a parameter estimation problem was widely studied in the context of radar and sonar applications, and the CRB has been derived under a variety of conditions. For the prototype "edge detection" ranging system discussed above, the CRB can be used to calculate a lower bound for the variance of the estimate for the range $\hat{r}_{as}$ $$\sigma_{\hat{r}}^2 \geq \frac{c^2}{(2\pi B)^2 E_s/N_0} \left(1 + \frac{1}{E_s/N_0}\right) \quad (1)$$

where $\sigma_{\hat{r}}^2$ is the variance of the range estimate, c is the speed of light, B is the occupied signal bandwidth in Hertz, and $E_s/N_0$ is the signal energy to noise density ratio. The SNR and $E_s/N_0$ are related by $$\frac{E_s}{N_0} = t_s B \cdot SNR \quad (2)$$

where $t_s$ is the signal duration during which the bandwidth, B, is occupied, i.e. the time during which the signal is being transmitted.

Thus, the Cramer-Rao limit shows that the accuracy that can be achieved with a single measurement is dependent on the bandwidth and the ratio $E_s/N_0$. The bandwidth is fixed and depends on the bandwidth the devices are operating in. At the lower bandwidths around 900 MHz (868/900/915 MHz) the bandwidth is typically either 12.5 kHz or 25 kHz.

The ratio $E_s/N_0$ is determined by the signal strength of the signal versus the noise floor (the SNR) and also by the length of the code to be correlated as part of the signal (represented by the $t_s B$ term).

The ratio can be increased (and thus the accuracy can be increased) by using a longer correlation code (which results in a longer time $t_s$ that the signal is present). This can be achieved by extending the bit pattern of a single transmission (i.e. increasing the number of bits in the bit pattern), and/or by using multiple transmit/response pairs in the measurement of the time of flight. It has also been found that both a longer code and multiple transmit/response pairs help with synchronizing the clocks of both devices.

Clearly, the length of the code pattern transmitted as part of the ToF procedure has an impact on the energy use of the devices 12, 14, especially at the transmitting side due to the requirement to transmit a longer signal. The number of transmit/response pairs required to make a ToF-based distance measurement also directly impacts energy use as each additional transmit/response pair results in additional energy expenditure.

It is undesirable to make a single transmission too long as it is less likely that a good signal will be received at the other device in the presence of intermittent disturbances of the signal. It is also undesirable to increase the number of transmit/response pairs to a very large number because each transmit/response pair requires additional time between the pairs, thus making the period for the ToF-based distance measurement too long.

Thus, in accordance with the invention, the length of the predefined code signal and/or the number of transmit/response pairs (i.e. the number of times one of the devices transmits the predefined code signal to the other device and receives the predefined response signal from the other device) is adapted to achieve a desired level of accuracy for the time-of-flight-based distance measurement.

Figure 3:
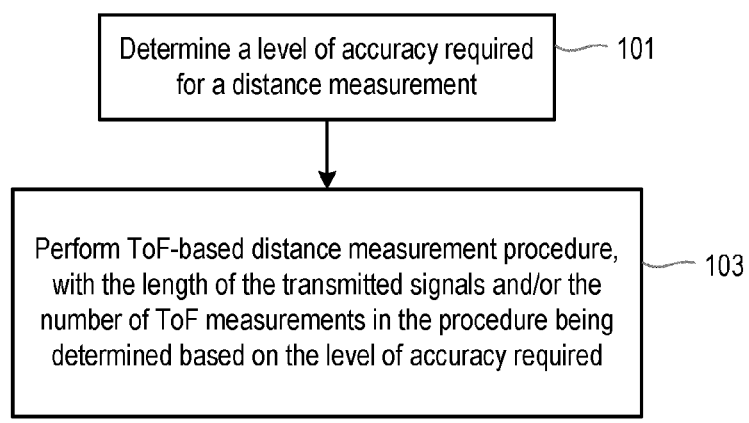
FIG. 3 is a flow chart illustrating a method of measuring the distance between a first device and a second device according to the invention.

FIG. 3 illustrates a method of measuring the distance between a first device 12 and a second device 14 in accordance with the invention. In a first step, step 101, the level of accuracy required for the distance measurement is determined.

As described in more detail below, where the ToF-based distance measurement is used to determine the position of a first device 12 with respect to a particular location, such as the boundary of a safe zone, the required level of accuracy can be determined from an initial estimate of the position of the first device 12 or an initial estimate of the distance between the first device 12 and the second device 14.

For example, if the initial estimate of the position or distance indicates that the first device 12 is close to the boundary of the safe zone (or within range of the boundary that is within the margin of error for the initial estimate of the position or distance), a higher level of accuracy may be required in order to clarify which side of the boundary the first device 12 is than when the initial estimate places the first device 12 away from the boundary. In some cases, the initial estimate of the distance between the first device 12 and the second device 14 is based on a signal strength (e.g. RSSI) measurement, and in other cases the initial estimate of the distance can be based on a ToF measurement using default values for the code signal length and/or number of transmit/response pairs. In yet further cases, the initial estimate of the position or distance can be determined using another type of distance or position estimation technique, such as cellular base station triangulation or a low-accuracy satellite positioning system measurement.

Once the level of accuracy required for the distance measurement has been determined, the required level of accuracy is used to select the length of the code signal to be used in the time-of-flight measurement and/or the number of times a time-of-flight measurement is obtained in order to determine the distance (e.g. the number of transmit/response pairs required to be sent), and the time-of-flight-based distance measurement procedure is performed using the code signal of the selected length with the selected number of transmit/response pairs (step 103). In some embodiments, as described in more detail below, a predetermined number of transmit/response pairs (time-of-flight measurements) can be used with a code signal of a selected length to provide an initial measurement of the distance, and a decision can be taken as to whether it is necessary to acquire more time-of-flight measurements using further transmit/response pairs to improve the accuracy of the measurement.

In general, the higher the level of accuracy required, the longer the code signal used (i.e. the code signal includes more bits than when lower accuracy is acceptable) and/or the more transmit/response pairs required.

In one example, the distance measurement is to be accurate to within 10 meters. The SNR is a value that depends on the actual strength of the signal received versus the amount of noise in the environment. The SNR can be estimated by measuring the RSSI when the signal from the second device 14 is present and also measuring RSSI when the signal from the second device 14 is not present. The ratio between these two RSSIs provides the initial estimate for the SNR.

Assuming an initial estimate of the SNR is 20 dB, then with B=25 kHz and a required accuracy of 10 m, equation (2) provides that $t_s \cdot B \cdot SNR$ must be greater than 36450. An SNR of 20 dB is the same as a factor 100 for the SNR, so $t_s 25000*100>36450$, resulting in $t_s>14.6$ milliseconds.

With this initial estimate of 14.6 milliseconds, a bit pattern can be created that includes encoded information such as the sending device ID and a time stamp that covers the specified amount of time with sufficient information content. As the SNR is only an initial estimate, in practice it may not be sufficiently accurate to get the estimate of the signal length immediately. Therefore a number of iterations can be performed with this pattern until the statistical variation received from the iterations shows that a valid estimate has been obtained. It will be noted that the accuracy improves with the square root of the number of iterations.

Figure 4:
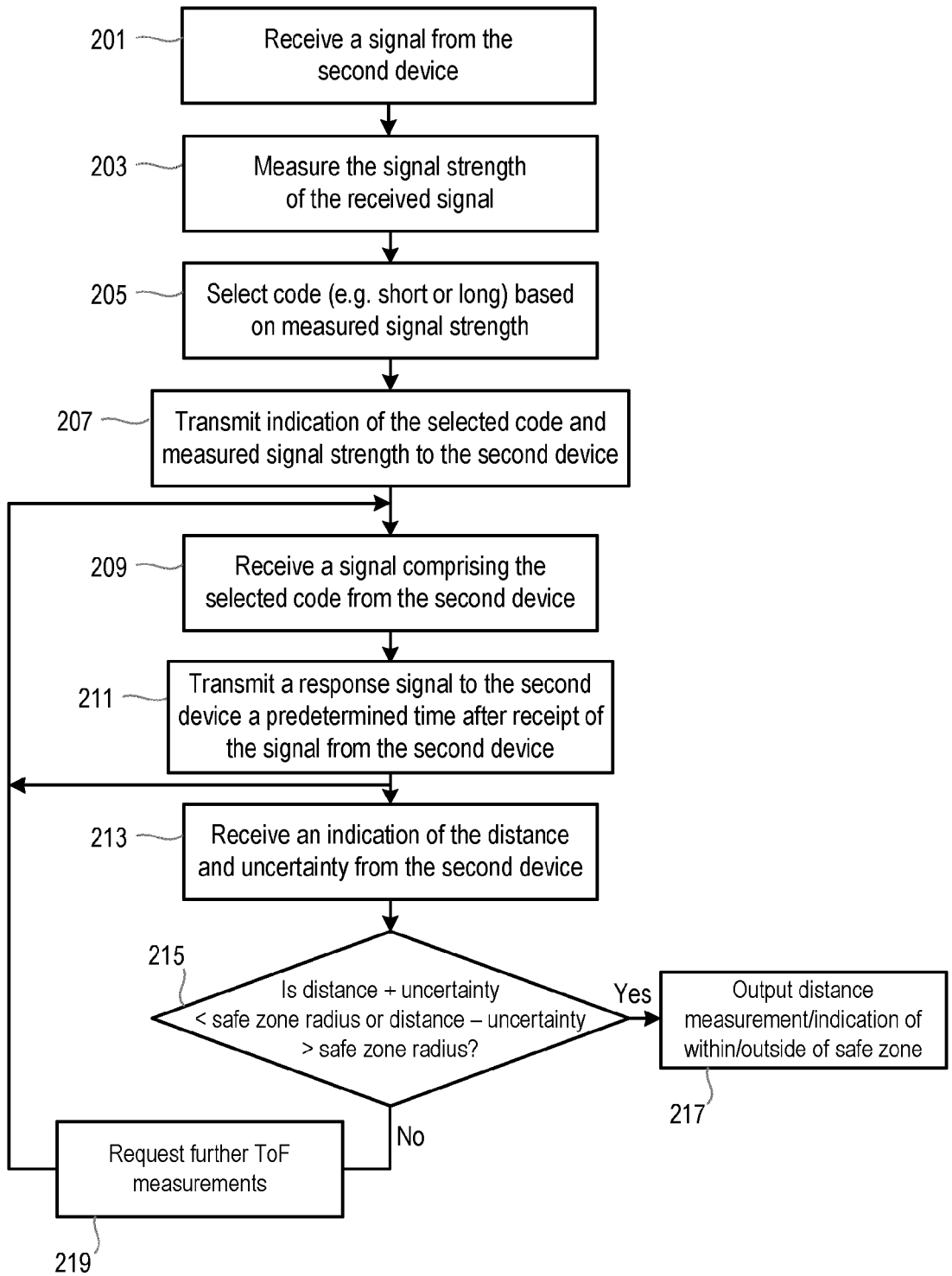
FIG. 4 is a flow chart illustrating a method of operating a first device to determine the location of a user according to an embodiment of the invention.
Figure 5:
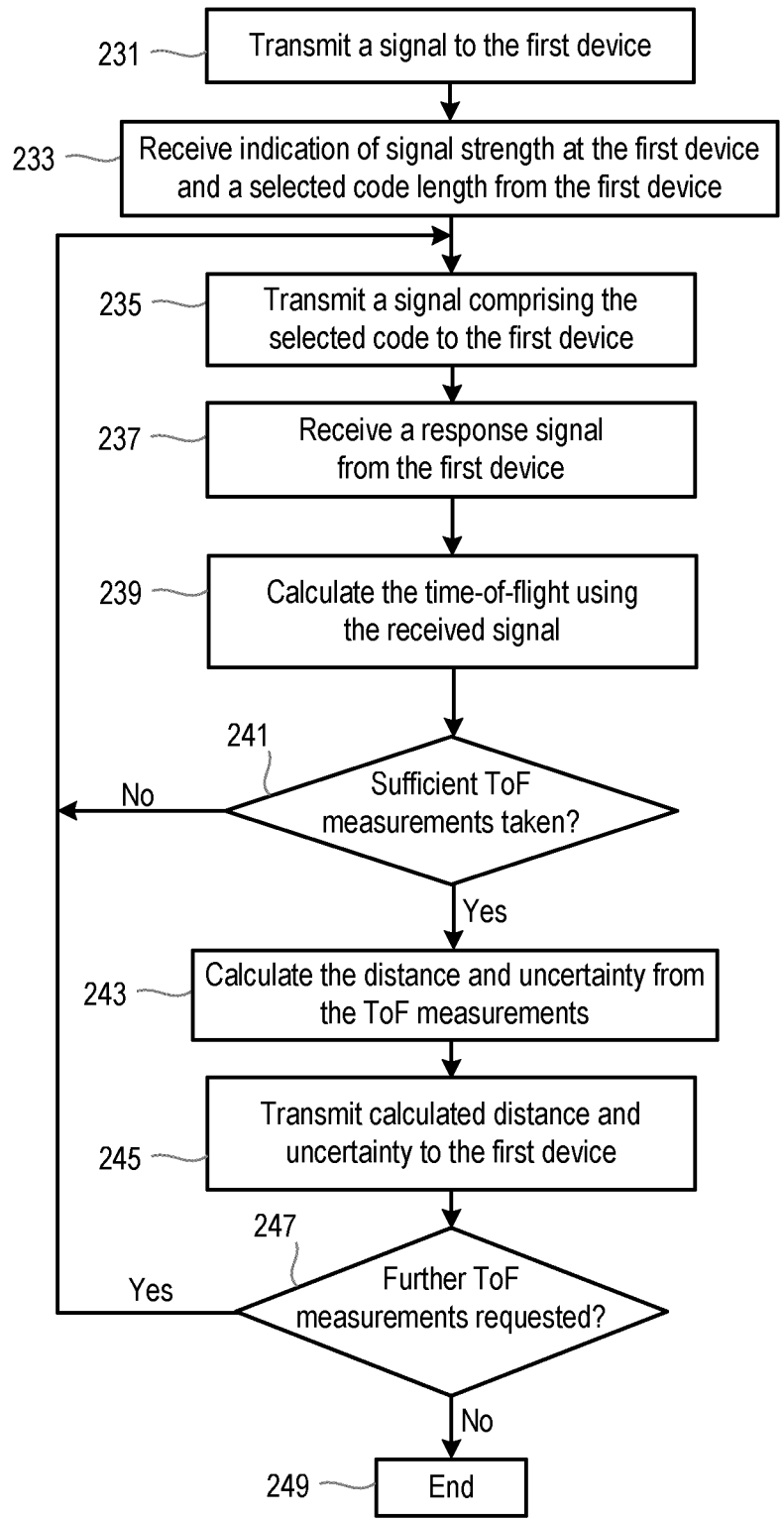
FIG. 5 is a flow chart illustrating a method of operating a second device to determine the location of a user according to an embodiment of the invention.

FIGS. 4 and 5 illustrate exemplary methods of operating the first and second devices 12, 14 respectively to perform and use time-of-flight measurements to determine whether the first device 12 is within a predetermined safe zone for the user. In these embodiments, the first device 12 is a user-worn or carried device that moves with the user and the second device 14 is a base unit that is in a fixed location. The safe zone corresponds to a circle centred on the base unit 14 having a fixed radius (e.g. 15 meters when the base unit 14 is located in the home of the user).

In this embodiment, the strength of a signal received at one of the devices 12, 14 from the other device 12, 14 is used to provide the indication of the required accuracy for the ToF-based distance measurement.

In a first step, step 201, the first device 12 receives a signal from the second device 14 using transceiver circuitry 18 and antenna 20. This signal is transmitted by the antenna 30 and transceiver circuitry 28 in the second device 14 (step 231 in FIG. 5) and can include a data field indicating the transmission power of the second device 14. The second device 14 may transmit this signal periodically or frequently, for example every 0.5 seconds.

After receipt of the signal, the processing unit 16 in the first device 12 measures the signal strength (e.g. the RSSI) of the received signal (step 203) and selects a code signal length based on the signal strength to use in the distance measurement procedure (step 205). In some embodiments where only two code lengths are available (e.g. a short and long code), the short code is selected when the measured signal strength (or an SNR derived from the measured signal strength) is above a threshold value (i.e. lower accuracy is acceptable) and the long code is selected when the measured signal strength (or an SNR derived from the measured signal strength) is below the threshold value (i.e. higher accuracy is desired). In other embodiments, more than two code lengths may be available with corresponding threshold values. In some embodiments, the code sequence can be a pseudo-random pattern which can be generated at the required length as required, while in other embodiments the code sequences can be predetermined and stored in a memory.

In later embodiments, for example as described with reference to FIG. 10, the measured signal strength is also used by the processing unit 16 in the first device 12 to make an initial measurement of the distance between the first device 12 and the second device 14.

After determining the code length, the first device 12 transmits an indication of the selected code length and the measured signal strength (e.g. RSSI) to the second device 14 (step 207) using the transceiver circuitry 18 and antenna 20.

On receipt of the indication of the selected code length and the measured signal strength from the first device 12 by the transceiver circuitry 28 and antenna 30 (step 233 of FIG. 5), the second device 14 starts the distance measurement procedure by transmitting a signal comprising the selected code signal to the first device 12 using the transceiver circuitry 28 and antenna 30 (step 235 of FIG. 5). The transmitted signal may comprise just the selected code signal, or it may comprise additional information such as the signal strength (e.g. RSSI) of signals received at the second device 14 from the first device 12 and/or a unique identifier for the transmitted signal. In an exemplary embodiment, the transmitted signal has a size of five bytes plus the preamble which is sufficient for the selected code signal, the RSSI and signal identifier, and the signal is modulated at a rate of 4.8 kbps which means that the signal lasts no more than 1 ms.

On receipt of the signal from the second device 14 (step 209 in FIG. 4), the first device 12 responds by transmitting a response signal to the second device 14 (step 211). The processing unit 16 controls the transceiver circuitry 18 to transmit the response signal a predetermined time after receipt of the signal from the second device 14 (which may be defined in terms of a predetermined number of clock cycles of the processing unit 16 in the first device 12). The response signal transmitted by the first device 12 can be the same signal as the predefined signal transmitted by the second device 14, or it can be another predefined signal that is recognisable by the second device 14. In some embodiments, each device 12, 14 can include their identity in the code signal/response signal. In some embodiments, each device 12, 14 can include an indication of the received signal strength at their side in the code signal/response signal so that both devices are aware of the amount of interference at their side of the system.

When the second device 14 receives the response signal from the first device 12 (step 237 in FIG. 5), the processing unit 26 in the second device 14 calculates the time-of-flight for the received signal (step 239). That is, the processing unit 26 calculates the time elapsed from the transmission of the signal in step 235 to the receipt of the response signal from the first device 12 in step 237 and subtracts the predetermined time period that the first device 12 waits before sending the response signal in step 211. In step 237 the processing unit 26 correlates the received signal with the known pattern that is expected in the code signal from the first device 12, and time-shifts the pattern until the highest correlation is obtained. The point at which the highest correlation is obtained provides the time of receipt for the received signal. The accuracy of the time of receipt depends on the number of edges in the pattern. The use of a pseudo-random pattern is advantageous here since the pattern is unique, so unlikely to occur due to interference, and at the same time contains a large number of edges that the correlation can be done with.

In equation form:

$$t_{ToF} = t_2 - t_1 - t_w \quad (3)$$

where $t_{ToF}$ is the time-of-flight, $t_2$ is the time at which the response signal is received at the second device 14, $t_1$ is the time at which the signal comprising the code signal is transmitted and $t_w$ is the predetermined time period between the first device 12 receiving the signal comprising the code signal and transmitting the response signal.

After calculating the time-of-flight, the processing unit 26 determines whether a sufficient number of time-of-flight measurements have been made in order to calculate the distance between the first device 12 and the second device 14 (step 241). In some embodiments, a single time-of-flight measurement is sufficient, but in other embodiments, a plurality of time-of-flight measurements need to be taken. The number of measurements required may be a default or initial value. In some embodiments, the initial number of measurements performed can be 10, which provides a factor 3 improvement in accuracy and a reasonable statistical estimate of the variance.

If it is determined that sufficient time-of-flight measurements have not yet been taken, the method returns to step 235 in which the second device 14 transmits another signal comprising the selected code to the first device 12.

If it is determined in step 241 that sufficient time-of-flight measurements have been taken in order to determine the distance between the first device 12 and the second device 14, the method moves to step 243 in which the processing unit 26 calculates the distance between the first device 12 and the second device 14 from the average of the time-of-flight measurements. The distance is given by:

$$d = \left[ \left( \sum_{n=1}^{N} t_{ToF}(n) \right) / N \right] * \frac{c}{2} \quad (4)$$

where d is the distance, N is the number of time-of-flight measurements made, $t_{ToF}(n)$ is the n-th time-of-flight measurement and c is the speed of light.

The processing unit 26 also determines the uncertainty in the time-of-flight measurements in step 241. The uncertainty can be calculated using:

$$\text{variance} = \sqrt{\sum_{n=1}^{N} ((t_{ToF} - \text{average}(t_{ToF}))^2)} \quad (5)$$

where average($t_{ToF}$) is the mean of the time-of-flight measurements.

The calculated distance and uncertainty are transmitted to the first device 12 (step 245).

On receipt of the distance and uncertainty (step 213) the processing unit 16 in the first device 12 determines whether it would be useful to obtain further time-of-flight measurements in order to improve the accuracy of the distance measurement. In particular, the processing unit 16 determines whether the uncertainty in the distance measurement means that it is not clear whether the user is in the safe zone or not. It will be appreciated that the uncertainty in the distance measurement means that the actual distance, $d_{dual}$, from the first device 12 to the second device 14 is anywhere in the range [d−u, d+u], where u is the uncertainty in the distance measurement d.

Figure 6:
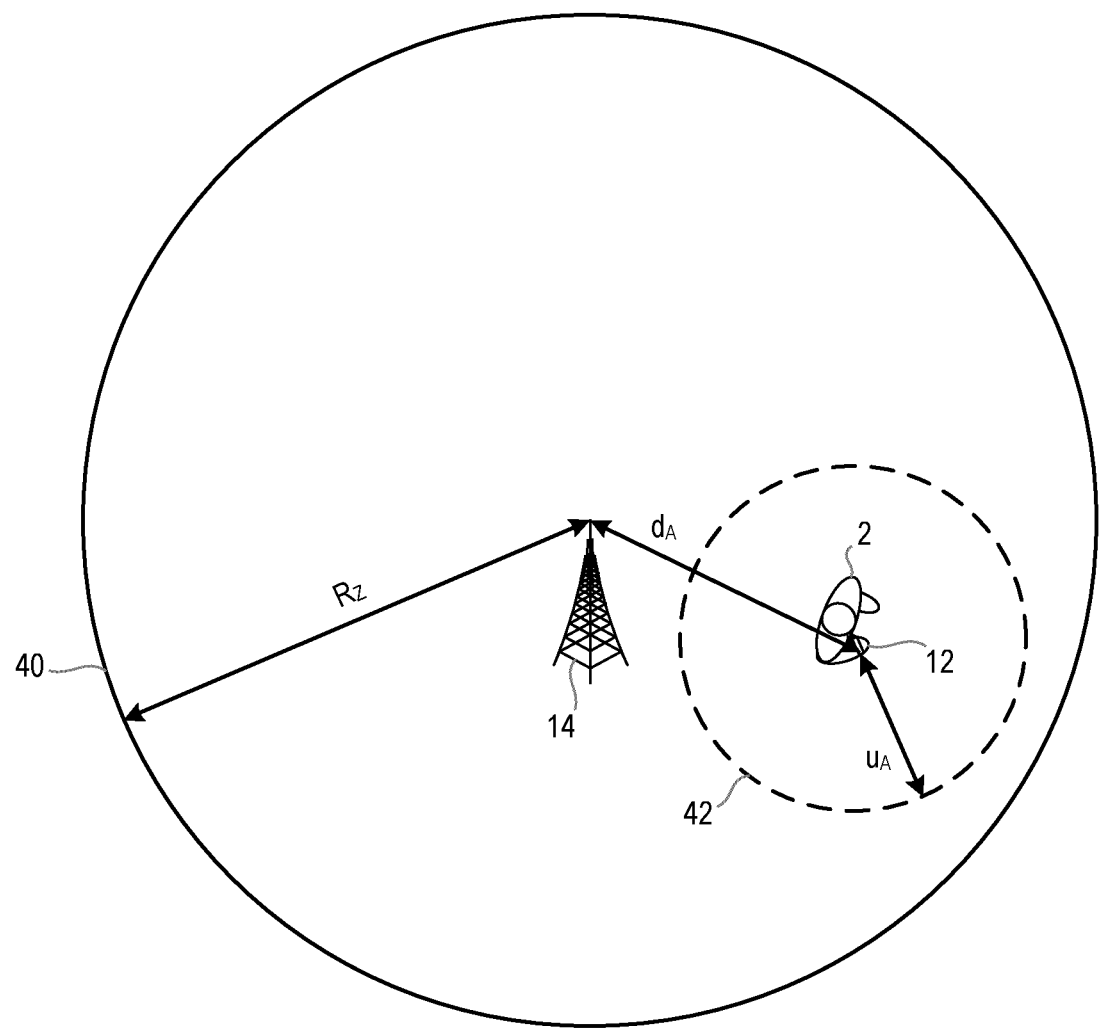
FIG. 6 is an illustration of a first distance and uncertainty measurement.
Figure 7:
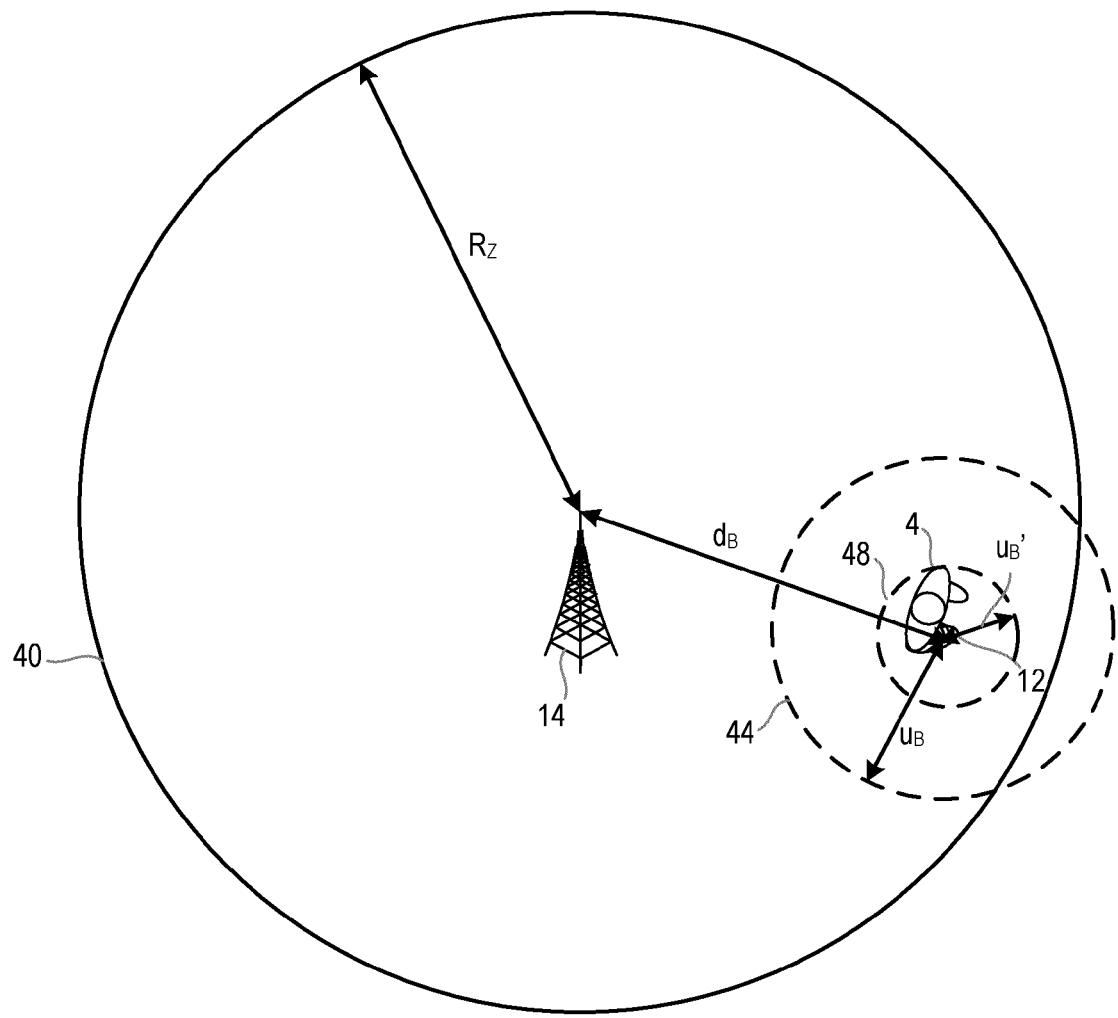
FIG. 7 is an illustration of a second distance and uncertainty measurement.
Figure 8:
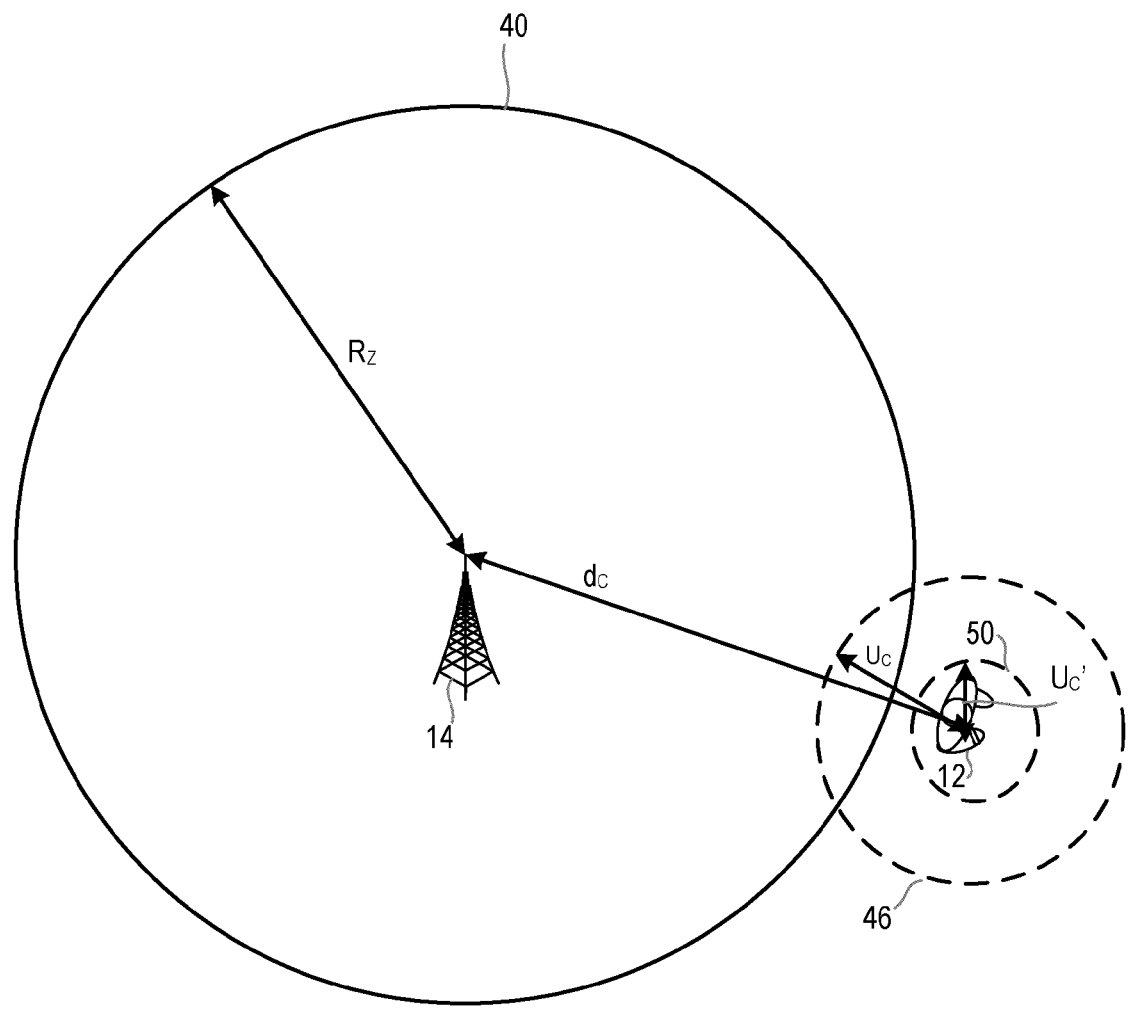
FIG. 8 is an illustration of a second distance and uncertainty measurement.

FIGS. 6, 7 and 8 illustrate three different scenarios where a safe zone 40 of radius $R_z$ is centred on the second device 14. In FIG. 6, the user 2 that is carrying the first device 12 has been determined by the second device 14 to be a distance $d_A$ from the second device 14 with an uncertainty in the distance measurement of $u_A$. This uncertainty in the distance measurement means that the user 2 and first device 12 could be any distance between $d_A - u_A$ and $d_A + u_A$ from the second device 14, which is indicated by circle 42 that is centred on the first device 12. In this case, $d_A + u_A < R_z$ so it is clear that despite the uncertainty in the distance measurement the user 2 and first device 12 are within the safe zone 40.

However, in FIG. 7 the user 2 and first device 12 are much closer to the boundary of the safe zone 40 (and/or the uncertainty in the distance measurement is larger). The distance between the first device 12 and the second device 14 is $d_B$ (with $d_B < R_z$) which places the user 2 and first device 12 inside the safe zone 40. However, the uncertainty in the measurement is $u_B$ (indicated by circle 44 centred on the first device 12) and $d_B + u_B > R_z$, so it is not conclusive whether the user 2 and first device 12 are in the safe zone or not.

In FIG. 8, the user 2 and first device 12 are again close to the boundary of the safe zone 40, but in this case the distance measurement $d_C$ between the first device 12 and the second device 14 (with $d_C > R_z$) places the user 2 and first device 12 outside the safe zone 40. However, the uncertainty in the measurement is $u_C$ (indicated by circle 46 centred on the first device 12) and $d_C - u_C < R_z$, so it is not conclusive whether the user 2 and first device 12 are outside the safe zone or not.

Returning to FIG. 4, in step 215 the processing unit 16 of the first device 12 determines whether either of the following criteria are true:

$$d+u<R \qquad (6)$$

$$d-u>R \qquad (7)$$

where R is the predefined radius of the safe zone.

If either or both of these criteria are true, then in step 217 the processing unit 16 outputs the distance measurement and/or an indication of whether the first device 12 is inside or outside the safe zone (as appropriate based on a comparison of the distance measurement d to the radius of the safe zone R).

If neither criteria are true (i.e. one of the scenarios in FIGS. 7 and 8 apply) then it is necessary to perform further time-of-flight measurements in order to try to reduce the uncertainty in the measurements and produce a confident distance measurement. For example, if in the scenario in FIG. 7 the uncertainty in the measurements could be reduced to $u_B'$ where $d_B + u_B' < R_z$ (indicated by circle 48 in FIG. 7) or in the scenario in FIG. 8 the uncertainty in the measurements could be reduced to $u_C'$ where $d_C - u_C' > R_z$ (indicated by circle 50 in FIG. 9) then it would be possible to output a distance measurement or indication that the first device 12 is or is not in the safe zone 40.

Thus the first device 12 sends a request to the second device 14 in step 219 to request a further set of time-of-flight measurements and returns to step 209 to await receipt of a signal from the second device 14 comprising the code.

In the second device 14, if further time-of-flight measurements are requested by the first device 12 (step 247 in FIG. 5) the method returns to step 235 and transmits a signal comprising the code. If no further time-of-flight measurements are requested, the method in the second device 14 ends (step 249).

Once the further time-of-flight measurements have been made, the distance and uncertainty are recalculated by the second device 14 (step 243) and the decision output by the first device (in step 217) if one or both of the criteria in step 215 are satisfied, or yet further measurements are requested (step 219) if neither criteria in step 215 are satisfied.

Although not shown in FIGS. 4 and 5, when further time-of-flight measurements are required in step 219 in order to improve the accuracy of the distance measurement, it is also possible for the further time-of-flight measurements to be performed using transmit and response signals that use longer code signals than the initial set of time-of-flight measurements. The use of a longer code signal is possible regardless of whether a short or long code signal was selected in step 205 of the method of FIG. 4.

As noted above FIGS. 4 and 5 show an exemplary implementation of a time-of-flight measurement procedure according to the invention between two devices 12, 14. However, it will be appreciated that various steps shown in FIGS. 4 and 5 as being performed by a particular device 12, 14 can be implemented in the other device in alternative implementations.

For example, in some implementations the amount of processing performed by the first device 12 (which may be a battery-powered portable user device) can be minimised by having steps such as step 205 (selecting the code length) and steps 215-219 (determining whether further time-of-flight measurements are required and sending a signal requesting those measurements) performed by the second device 14 (which may be a base unit that is connected to a mains power supply). In this case, the second device 14 would select the code length based on the signal strength measured at the first device 12 (and which is reported by the first device 12 to the second device 14) and transmit the indication of the selected code to the first device 12. Alternatively or in addition, the second device 14 may provide the output indicating the distance measurement or whether the first device 12 is inside or outside the safe zone.

In another example, the processing steps may be performed in the first device 12 (for example if the first device 12 is a smartphone or other device that includes a sufficiently powerful processing unit 16), which can reduce the complexity of the second device 14. In this case, the first device 12 may initiate the time-of-flight measurement by transmitting the first signal comprising the selected code signal and can calculate the time-of-flight (e.g. as in step 239), and/or the first device 12 may calculate the distance and uncertainty from the ToF measurements (e.g. as in step 243).

Those skilled in the art will appreciate that there are other ways in which the method steps can be distributed between the first and second devices 12, 14 in order to perform the time-of-flight measurement procedure according to the invention.

It has been found that a disadvantage of performing time-of-flight measurements using narrowband signals (e.g. at or around a frequency of 900 MHz) is that the signals transmitted between the first and second devices 12, 14 may reflect off intervening objects with the result that the receiving device 12, 14 may react to a reflected component of the signal rather than to the signal that took the shortest (e.g. direct) path (the reaction being the transmission of the response signal or the measurement of the time-of-flight). This is particularly a problem where the first received component of the signal is not the strongest received component of the signal.

Therefore, to deal with this multi-pathing, preferably the second device 14 is provided with a rake receiver (e.g. a software-defined radio implementing a rake receiver or another type of correlating receiver that allows for detection of the same code sequence at different points in time). The use of a rake receiver in the second device 14 is generally acceptable where it is a base unit and is mains powered, unlike the worn device which is battery powered. The rake receiver allows for detection of both the 'earliest' signal received from the first device 12 at the second device 14 and the strongest signal. The presence of a time lag between the receipt of the earliest signal and the strongest signal is an indication of a strong reflection in the path between the first device 12 and the second device 14. As the first device 12 is typically a portable device and comprises a simple radio transceiver 18 and antenna 20 it cannot easily detect this multipathing and it is possible that the first device 12 could transmit the response signal comprising the selected code signal in response to a reflected component of the signal rather than the direct component. Thus, when calculating the time-of-flight, it is not known to the second device 14 whether the first device 12 reacted to the direct signal or a reflection.

Figure 9:
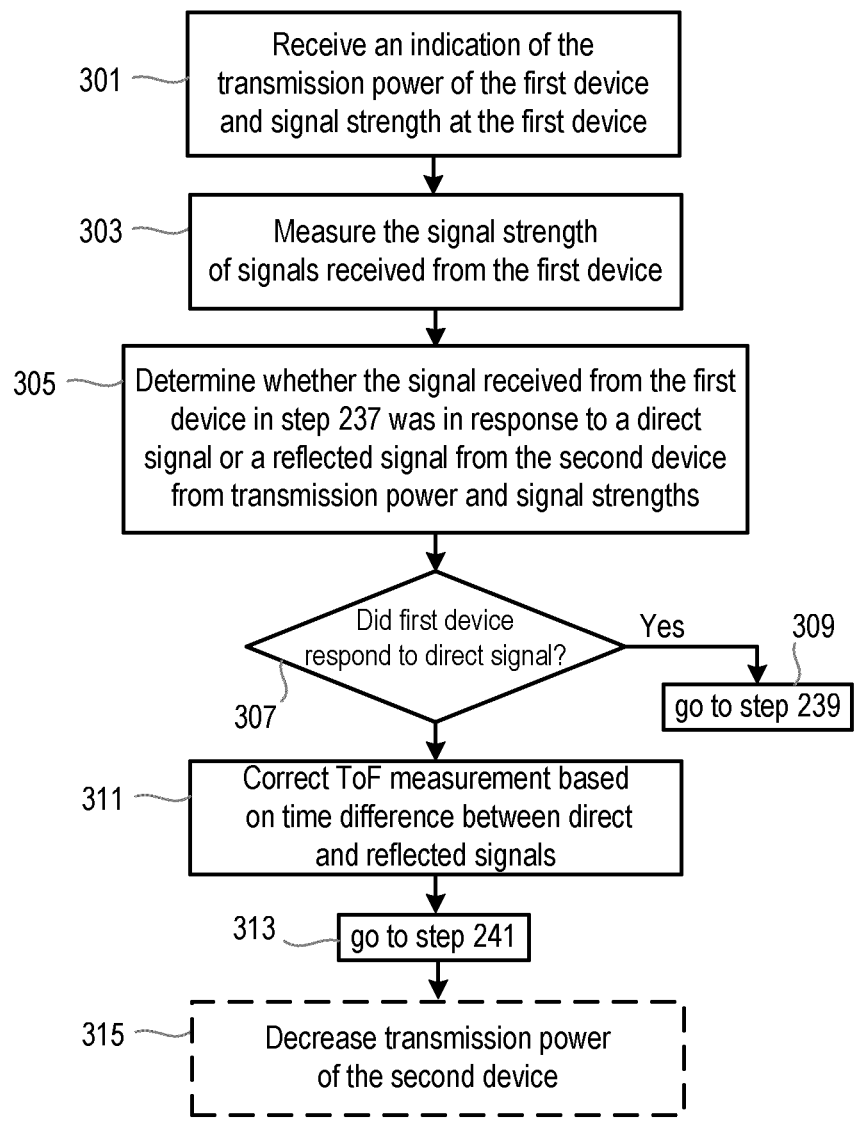
FIG. 9 is a flow chart illustrating a method of processing time of flight measurements to account for signal reflections.

Thus, in embodiments of the invention, the second device 14 performs the method shown in FIG. 9 to determine whether the first device 12 responded to a direct component of the signal or a reflection. It will be appreciated that this method can be performed following receipt of a response signal from the first device (e.g. following step 237 in FIG. 5).

In a first step, step 301, the second device 14 receives an indication of the power used by the first device 12 to transmit the response signal and an indication of the strength of signals from the second device 14 as received at the first device 12.

In the next step, step 303, the second device 14 measures the strength of the signal received from the first device 12. This measurement is preferably performed on the response signal received in step 237.

Then, in step 305, the second device 14 estimates whether the signal received in step 237 was transmitted in response to receiving a direct signal or a reflected signal using the indications of the received signal strengths at the first device 12 and second device 14 and the known transmission powers of the first device 12 and the second device 14.

In step 305, it is assumed that the paths followed by both the direct component of the signal and a reflected component are bi-directional, i.e. the first device 12 transmits to the second device 14 via both the direct and the reflected path and the second device 14 transmits to the first device 12 via both the direct and the reflected path.

In the above embodiments, the first device 12 (i.e. the device being worn or carried by the user) does not have the processing power to identify which is the direct path and which is the reflected path. Instead, the first device 12 just reacts (to send the response signal) when it receives a signal with a sufficient strength (which might be from either the direct path or the reflected path).

The second device 14 (the base station) determines in step 305 which path is which by correlating the signals and then using the information about the strength at which the direct path arrived ($P_{direct}$) and at what strength the reflected path arrived ($P_{reflected}$) The second device 14 is aware of the transmission power ($P_{firstdevice}$) of the first device 12 from the information received in step 301.

The relative attenuation across the direct and reflected paths are given by:

$$attenuation_{direct} = \frac{P_{direct}}{P_{firstdevice}} \quad (8)$$

$$attenuation_{reflected} = \frac{P_{reflected}}{P_{firstdevice}} \quad (9)$$

Thus the second device 14 can calculate the signal strength at which the direct signal and the reflected signal will arrive at the first device 12 using:

$$R_{direct} = P_{seconddevice} \frac{P_{direct}}{P_{firstdevice}} \quad (10)$$

$$R_{reflected} = P_{seconddevice} \frac{P_{reflected}}{P_{firstdevice}} \quad (11)$$

where $P_{seconddevice}$ is the transmission power of the second device 14.

As the second device 14 is also aware of the sensitivity of the first device 12 and the received signal strength (e.g. RSSI) at the first device 12, the second device 14 can check whether the direct signal is closest to the expected strength of the direct path or of the reflected path. If the direct signal is below the sensitivity of the first device 12 (i.e. the first device 12 is unable to receive and/or react to the direct signal), then the second device 14 can determine that the first device 12 reacted to the stronger reflected signal. If the direct signal is above the sensitivity of the first device 12, then the closest approximation of the signal strength (e.g. RSSI) is taken as the most likely candidate for the trigger for the response signal from the first device 12.

In step 307, if it is determined that the first device 12 did respond to a direct signal the method returns to step 239 of FIG. 5 (step 309 in FIG. 9) and the time-of-flight is calculated.

If it is determined that the first device 12 responded to a reflected signal, the second device 14 calculates the time-of-flight measurement based on the time difference between the direct and reflected signals as indicated by the direct and reflected signals received by the rake receiver in the second device 14 (step 311). The second device 14 uses the rake receiver to select the direct component of the signal as the received signal and uses the time of arrival of that peak in the time-of-flight calculation. The time-of-flight can therefore be given by:

$$t_{ToF} = t_{2d} - t_1 - t_w - t_r \quad (12)$$

where $t_{ToF}$ is the time-of-flight, $t_{2d}$ is the time at which the direct response signal is received at the second device 14, $t_1$ is the time at which the signal comprising the code signal is transmitted by the second device 14, $t_w$ is the predetermined time period between the first device 12 receiving the signal comprising the code signal and transmitting the response signal and $t_r$ is the time difference between the direct and reflected signals.

After calculating the time-of-flight, the method returns to step 241 in FIG. 5 (step 313 of FIG. 9).

In an optional step, the second device 14 can try to verify that the first device 12 reacted to a stronger reflected signal by decreasing the power used by the second device 14 to transmit signals to the first device 12 (step 315). Sufficiently decreasing the transmission power should mean that the first device 12 is no longer able to receive the direct signal and will react to the reflected signal each time. In that case, the correction $t_r$ can be applied to each time-of-flight measurement until the multi-pathing situation resolves.

Figure 10:
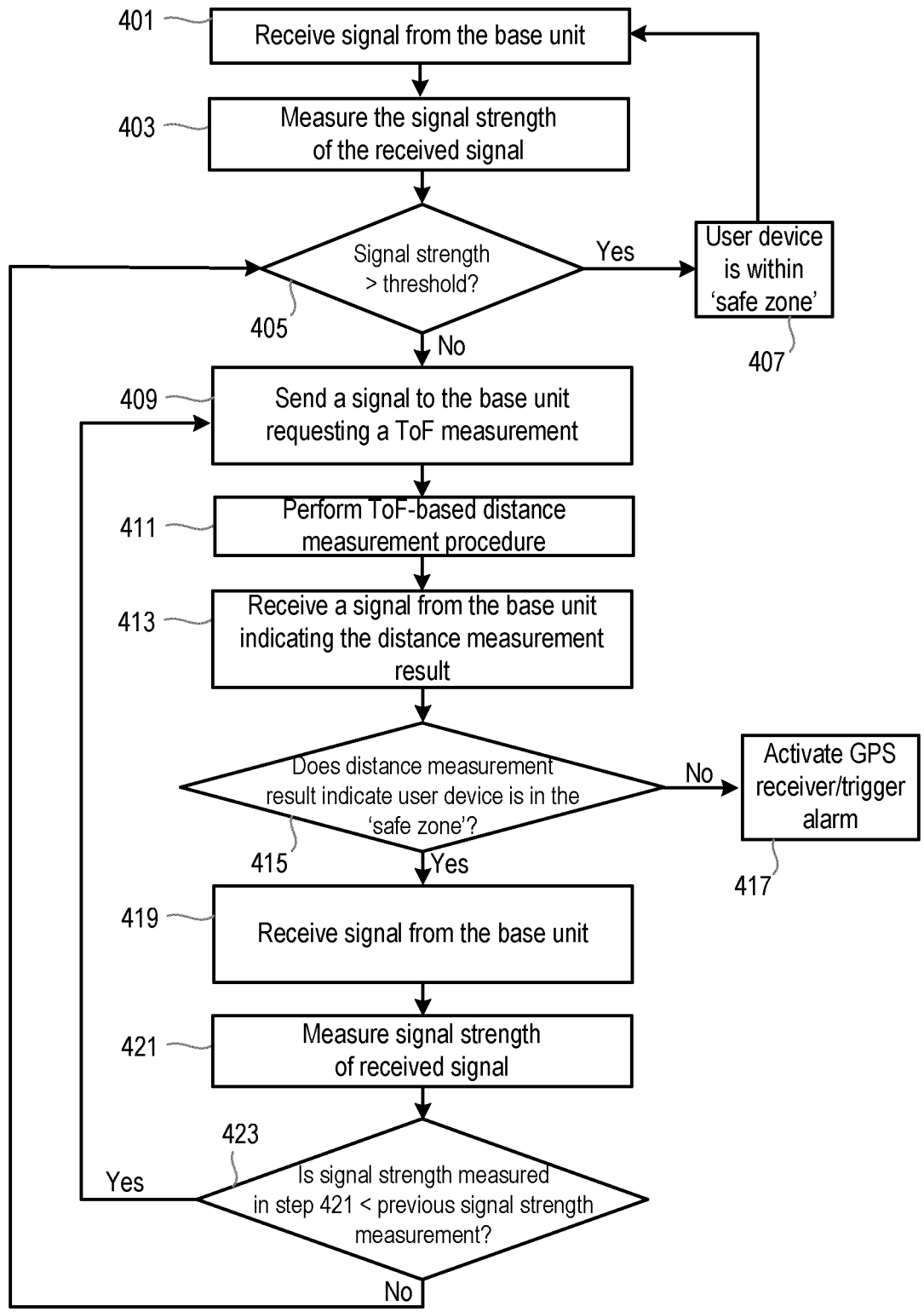
FIG. 10 is a flow chart illustrating a method of determining the location of a user according to a further embodiment of the invention.

FIG. 10 is a flow chart illustrating a method of operating a user device to determine the location of a user according to a further embodiment of the invention. In this embodiment, the invention is implemented in a personal tracking system, with the first device 12 being a portable user device and the second device 14 being a base unit. The personal tracking system defines a safe zone for the user that extends a predetermined distance from the base unit.

In the personal tracking system, the user device 12 primarily uses a received signal strength-based measurement to determine the distance between the user device 12 and the base unit 14. Provided that this measurement indicates that the user device 12 is within the safe zone, no further distance measurement is required. However, if the measurement is inconclusive (i.e. the measurement suggests that the user device 12 is outside of the safe zone, although it is possible that the user is shielding the device 12 from the base unit 14) then a further distance measurement is made using time-of-flight.

Thus, the base unit 14 can be configured to regularly transmit or broadcast a signal (for example every 0.5 seconds or 1 second so that the user device 12 can rapidly detect when the user leaves the safe zone)) that the user device 12 can monitor. The transmitted signal can include a data field that indicates the transmission strength of the base unit 14.

In the first step of the method, step 401, the user device 12 receives the signal from the base unit 14.

In step 403 the user device 12 measures the signal strength (e.g. the RSSI) of the received signal.

The measured signal strength is compared to a threshold value in step 405. If the signal strength is greater than the threshold value then it is determined that the user device 12 is within the safe zone (step 407). The threshold value thus effectively defines the radius of the safe zone and should be set at an appropriate value for the desired radius.

If the signal strength is less than the threshold value, then it is possible that the user device 12 is outside the safe zone, or alternatively that the signal received at the user device 12 has been attenuated by passing through the user's body, and/or other objects or walls in the environment. Either way, it is not possible to conclude from the signal strength measurement where the user device 12 is located, and a separate distance measurement must be taken. Thus the user device 12 sends a signal to the base unit 14 requesting a time-of-flight based distance measurement (step 409).

In step 411 the time-of-flight measurement procedure is performed. This procedure is performed as described above with reference to FIGS. 3-5. That is, step 411 comprises operating the user device 12 according to the method in FIG. 4 (or a variant as described above) and operating the base unit 14 according to the method in FIG. 5 (or a variant as described above).

The result of the time-of-flight measurement procedure is received from the base unit 14 in step 413 and the result assessed in step 415. If the time-of-flight based distance measurement indicates that the user device 12 is outside the safe zone the method moves to step 417 in which an alarm is raised (for example to summon help to the user as they are wandering) and/or another location determination system (such as a satellite based positioning system, e.g. GPS) is activated in order to more accurately determine and track the location of the user while they are outside the safe zone.

If the time-of-flight measurement indicates that the user device 12 is in the safe zone, then the user device 12 records its current state as inside the safe zone but with an orientation or position that affects the received signal strength. The user device 12 then recommences monitoring the signals regularly transmitted or broadcast by the base unit and measuring the signal strength (steps 419 and 421).

The user device 12 monitors the measured signal strength for changes that indicate whether the signal conditions are improving (e.g. indicating that the orientation is improving and/or the user has moved such that there are less objects and/or walls obscuring the signal from the base unit 14) or worsening (e.g. indicating that potentially the user device 12 has now moved outside of the safe zone). In particular, the user device 12 compares the signal strength measured in step 421 following the time-of-flight measurement to the signal strength measured in step 403 prior to the time-of-flight measurement (step 423).

If the signal strength is now less than in step 403, i.e. the signal strength has decreased indicating that the user device 12 is potentially outside the safe zone, the method returns to step 409 and requests another time-of-flight distance measurement. Following that measurement, the next iteration of step 423 compares the new signal strength measured in the latest iteration of step 421 to the previous iteration of step 421. It will be appreciated that to avoid continuously performing updates each time there is slight change in signal strength, a minimum threshold can be applied so that the updates are only triggered if the change is larger than this minimum.

If in step 423 the signal strength measured in step 423 is above the signal strength measured in step 403 (i.e. the signal strength has increased) then the method returns to step 405 and it is determined how the new signal strength compares to the signal strength threshold.

As with the methods shown in FIGS. 4 and 5, the method shown in FIG. 10 is exemplary, and alternative implementations of the method are possible in which the processing steps are allocated differently between the user device 12 and base unit 14 to the allocation shown in FIG. 10.

Thus, there is provided an improved technique for performing a time-of-flight distance measurement that can provide a distance measurement to a desired level of accuracy while minimising power consumption. Also provided is a technique for use in a personal tracking system that determines whether a user is within a predetermined safe zone.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising a first device and a second device, the first device and the second device being configured to measure a distance between the first device and the second device;
   wherein the first device and the second device are configured to:
      obtain a distance measurement d using a first set of time-of-flight measurements;
      estimate an uncertainty u in the distance measurement d;
      evaluate
         whether d+u<R is satisfied, and
         whether d−u>R is satisfied
      wherein R is a predetermined distance;
      determine that a higher level of accuracy is required in the event that neither d+u<R nor d−u>R is satisfied and obtain a second set of one or more time-of-flight measurements;
      determine whether the first device and the second device are within the predetermined distance R of each other using the distance measurement d in the event that one or both of d+u<R and d−u>R is satisfied;

wherein the first device and the second device are further configured such that, after obtaining the second set of one or more time-of-flight measurements, the first device and the second device:

determine another distance measurement d' from the first set of one or more time-of-flight measurements and the second set of one or more time-of-flight measurements;

estimate an uncertainty u' in the distance measurement d';

evaluate
whether d'+u'<R is satisfied, and
whether d'−u'>R is satisfied;

determine that a higher level of accuracy is required in the event that neither d'+u'<R nor d'−u'>R is satisfied and obtain a third set of one or more time-of-flight measurements;

determine whether the first device and second device are within the predetermined distance R of each other using the distance measurement d' in the event that one or both of d+u<R and d−u>R is satisfied.

2. A method of measuring the distance between a first device and a second device, the method comprising:

measuring a first received signal strength of a first signal transmitted between the first device and the second device;

comparing the first received signal strength to a threshold value;

determining that the first device and the second device are within a predetermined distance of each other if the first received signal strength is above the threshold value;

if the first received signal strength is less than the threshold value, performing a first time-of-flight-based distance measurement to measure the distance between the first device and the second device, wherein a number of time-of-flight measurements obtained during the first time-of-flight-based distance measurement is determined according to an accuracy level required for the time-of-flight-based distance measurement;

wherein if it is determined using the first time-of-flight-based distance measurement that the first device and the second device are within the predetermined distance of each other, the method further includes:

measuring a second received signal strength of a second signal transmitted between the first device and the second device;

comparing the second received signal strength to the first received signal strength;

performing a second time-of-flight-based distance measurement if the second received signal strength is less than the first received signal strength;

comparing the second received signal strength to the threshold value if the second received signal strength is greater than the first received signal strength;

determining that the first device and second device are within the predetermined distance of each other if the second received signal strength is greater than the threshold value; and performing a third time-of-flight-based distance measurement if the second received signal strength is less than the threshold value.

3. A device, comprising:

transceiver circuitry for enabling communications with another device; and a processing unit configured to:

measure a first received signal strength of a first signal transmitted between the device and said another device;

compare the first received signal strength to a threshold value;

determine that the device and said another device are within a predetermined distance of each other if the first received signal strength is above the threshold value;

if the first received signal strength is less than the threshold value, perform a first time-of-flight-based distance measurement to measure the distance between the device and said another device, wherein the processing unit is configured to determine the number of time-of-flight measurements obtained during the first time-of-flight-based distance measurement according to an accuracy level required for the first time-of-flight-based distance measurement;

wherein if it is determined using the first time-of-flight-based distance measurement that the device and said another device are within the predetermined distance of each other, the processing unit is further configured to:

measure a second received signal strength of a second signal transmitted between the device and said another device;

compare the second received signal strength to the first received signal strength;

perform a second time-of-flight-based distance measurement if the second received signal strength is less than the first received signal strength;

compare the second received signal strength to the threshold value if the second received signal strength is greater than the first received signal strength;

determine that the device and said another device are within the predetermined distance of each other if the second received signal strength is greater than the threshold value; and perform a third time-of-flight-based distance measurement if the second received signal strength is less than the threshold value.

* * * * *